United States Patent Office

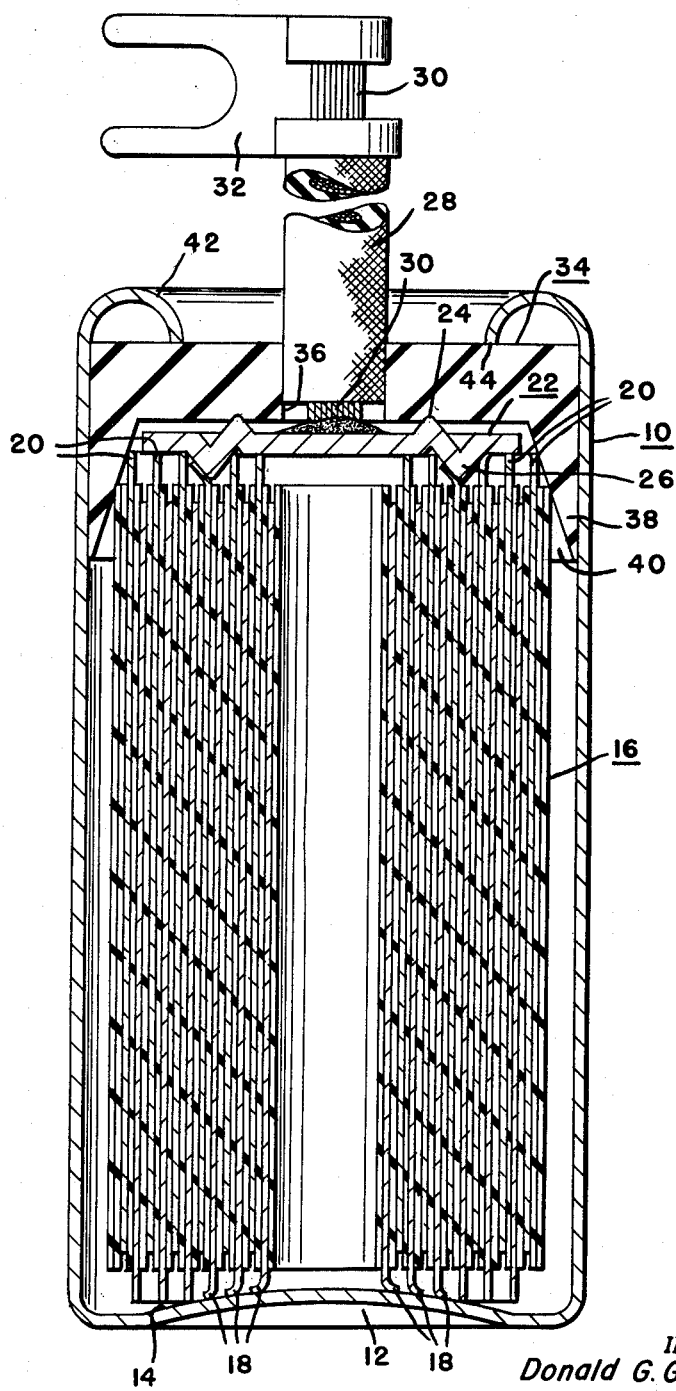

3,109,127
Patented Oct. 29, 1963

3,109,127
ELECTRICAL CONDENSER CONTAINER CLOSURE
Donald G. Guetersloh, Anderson, Ind., assignor to General Motors Corporation, Detroit, Mich., a corporation of Delaware
Filed Oct. 10, 1960, Ser. No. 61,565
8 Claims. (Cl. 317—260)

This invention relates to electrical condensers, and more particularly to condensers of the type that are commonly used in the ignition systems of internal combustion engines and for radio interferences suppression.

In the past it has been common practice to manufacture condensers of this type with a liner that insulates the coil winding unit of the condenser from the metal container. It also has been common practice to provide a washer between one end of the coil winding unit and the closed end of the metal container to insure a good electrical connection therebetween.

In contrast to the above described condenser construction, it is an object of this invention to provide a condenser wherein the liner of insulating material and washer are not required for satisfactory operation and durability.

Another object of this invention is to provide a condenser wherein the open end of the condenser container is closed by a member formed of insulating material that has a portion wedged between the coil winding unit and the container to center the coil winding unit in the container and to maintain the coil winding unit spaced from the metal container. In carrying this object forward a portion of the insulator that is wedged between the coil winding unit and the container preferably has one conical surface which provides effective centering of the coil winding unit.

A further object of this invention is to provide a condenser wherein the closed end of the metal container has an inner convex surface that contacts the metal foil of the coil winding unit to electrically connect the container and foil and thus eliminate the usual washer which previously has been thought to be required. This convex surface also aids in centering the coil winding within the container.

Further objects and advantages of the present invention will be apparent from the following description, reference being had to the accompanying drawings wherein a preferred embodiment of the present invention is clearly shown.

In the drawings, the single FIGURE drawing is a sectional view of a condenser made in accordance with this invention.

Referring now to the drawing, the reference numeral 10 generally designates a metal container for the condenser which may be formed of a suitable steel material. The container is preferably cylindrical and the closed end of the container 12 is bent in to form the convex surface designated by reference numeral 14 in the drawing. As will become more readily apparent hereinafter the bent in section 12 serves to apply an axial force to the condenser winding unit to maintain it positioned within the container 10 and also serves as an electrical connection between one side of the condenser winding unit and the container 10.

The condenser of this invention includes the condenser winding unit which is generally designated by reference numeral 16 and which includes alternate layers of metal foil and insulating material. The condenser is wound so that one winding of the foil projects from the lower end of the winding unit while another winding projects outwardly from the upper end of the coil winding unit 16. The lower foil sections are designated by reference numeral 18 whereas the upper foil sections are designated by reference numeral 20. It will be apparent that the winding that includes the foil ends 18 forms one side of the condenser whereas the coil winding that includes the ends 20 forms the other side of the condenser. As has been noted hereinbefore, the foil windings are insulated from each other by suitable insulating material that is interposed between the foil material during the winding of the coil winding unit 16.

The condenser of this invention includes a metal annular washer generally designated by reference numeral 22. This washer has an annular ridge 24 and a second annular ridge 26. An insulated lead wire designated by reference numeral 28 has the conductor portion 30 soldered or otherwise secured to the metal washer 22. It can be seen that the lead wire 28 is connected with a terminal designated by reference numeral 32.

In addition to the parts just described, the condenser includes a top closure member designated by reference numeral 34 for closing the open end of the metal container 10. The closure member 34 is formed of a molded hard rubber material or other suitable insulating material that is capable of being deformed and has a central opening 36 which receives the lead wire 28. The closure member 34 also has an annular lip section designated by reference numeral 38. This annular lip section has an outer cylindrical surface and an inner conical surface designated by reference numeral 40. It can be seen that the conical surface 40 engages the coil winding unit 16 to center it within the metal container 10.

In manufacturing the condenser of this invention, the container 10, when in an empty condition, is formed with the bent in section 12. When the container has been so bent, it may be filled with the various components of the condenser which have been described and the container is then crimped over as at 42 with an annular end surface 44 on the metal container engaging the rubber closure member 34. During this crimping operation the condenser winding unit 16 is axially compressed with the bent in section 12 forming a resilient support for one end of the condenser winding unit. The annular ridge 26, of course, is forced into tight engagement with the foil ends 20 whereas the annular ridge 24 of the washer 22 will be in tight engagement with the hard rubber member 34. The lip section 38 of the closure top 34 will be wedged between the condenser winding unit 16 and the container 10 in order to center the condenser winding unit within the container 10 and to prevent the outer surface of the same from contacting the container 10.

It can be seen that the condenser of this invention does not require a tubular insulating member that is ordinarily positioned between the condenser winding unit 16 and the container 10. In addition, there is no washer between the lower end of the condenser winding unit 16 and the container 10 as the bent in section 12 provides a good electrical connection between the condenser winding unit and the container 10. It will also be appreciated that the condenser is sealed in an efficient manner since the annular ridge 24 forms a seal with the hard rubber member 34 as well as does the end section 44 of the container which is crimped against the rubber member 34.

It can be seen from the foregoing that a condenser has been provided which is formed of a minimum number of parts and yet which has inherent durability and efficient sealing.

While the embodiment of the invention as herein disclosed constitutes a preferred form, it is to be understood that other forms might be adopted.

What is claimed is as follows:
1. An electrical condenser comprising, a container formed of metal material having a unitary closed end and an open end, said container forming one terminal side of the condenser, a condenser winding unit positioned within said container having opposite ends forming opposed electrical terminals for said winding unit, a washer member engaging the one end of said condenser winding unit, the opposite end of said condenser winding unit being electrically connected with said closed end of said container, a lead wire connected with said washer member, and a closure member closing the open end of said metal container formed of insulating material, said closure member having a central opening receiving said lead wire and having a section engaging said washer member, said closure member further having a section wedged between said condenser unit and said metal container for centering said condenser winding unit within said container.

2. An electrical condenser comprising, a metal container having an elongated section formed with an integral closed end and an open end, said closed end being formed with an internal convex surface, a condenser winding unit positioned within said container having opposite ends forming opposed electrical terminals for said winding unit, one end of said condenser winding unit engaging said convex surface to form a good electrical connection between one side of said condenser and said container, a metal washer engaging an opposite end of said condenser winding unit, a lead wire connected with said metal washer, and a closure member formed of insulating material closing the open end of said container, said closure member having a section engaging said washer and having another section wedged between said condenser winding unit and said container for centering said condenser winding unit within said container on said convex surface.

3. An electrical condenser comprising, a metal container having an elongated section formed with an integral closed end and an open end, a condenser winding unit positioned within said container having opposite ends forming opposed electrical terminals for said winding unit, an imperforate metal washer having a first annular ridge engaging one end of said condenser winding unit to form an electrical connection between one side of said condenser and said metal washer, the opposite end of said condenser winding unit being electrically connected with said container, a closure member closing the open end of said container, said closure member being formed of an insulating material, a central opening in said closure member, a lead wire passing through said opening and connected with one side of said metal washer, and a second annular ridge on said metal washer engaging said closure member.

4. An electrical condenser comprising, a container formed of metal material, said container having an integral closed bent in end, a condenser winding unit positioned within said container having opposite ends forming opposite electrical terminals for said winding unit, one end of said winding unit engaging said bent in end, a closure member formed of hard rubber material closing the open end of said metal container, a lead wire passing through said closure member, and means connecting said lead wire with an opposite end of said condenser winding unit, said closure member having integral means positioned between said condenser winding unit and said container for centering said condenser winding unit within said container and against said bent in end.

5. An electrical condenser comprising, a metal container having an elongated section formed with an integral closed end and an open end, a condenser winding unit positioned within said container having opposite ends forming opposed electrical terminals for said winding unit, a metal washer engaging one end of said condenser winding unit, a closure member closing the open end of said container formed of a hard rubber material, said closure member having a lip section wedged between said condenser winding unit and said container, a lead wire connected with said washer and passing through said closure member, and means for maintaining said condenser winding unit in axial compression, said last named means including a bent in section formed in the closed end of said metal container and a crimped section engaging said closure member, said bent in section being electrically connected with an opposite end of said winding unit.

6. An electrical condenser comprising, a metal container having a tubular section formed with an open end and an integral closed end, a condenser winding unit positio ned within said container having opposite ends forming opposed electrical terminals for said winding unit, one end of said winding unit being electrically connected with the closed end of the metal container, a closure member formed of insulating material closing the open end of said container and having a section positioned between the tubular section of the container and the winding unit to center the winding unit within the container, a metal washer member interposed between said closure member and the opposite end of said winding unit having a first integral annular ridge engaging said closure member and a second integral annular ridge engaging the opposite end of said winding unit, said container having a crimped-in section engaging said closure member, and a lead wire passing through said closure member and connected with a side of said washer member facing the closure member.

7. The condenser according to claim 6 wherein the integral closed end of the metal container in inwardly bent to engage an end of the winding unit.

8. An electrical condenser comprising, a metal container having a tubular section formed with an open end and an integral closed end, a condenser winding unit positioned with said container having opposite ends forming opposed electrical terminals for said winding unit, one end of said winding unit being electrically connected with the closed end of the metal container, a closure member formed of insulating material closing the open end of said container and having an integral lip section positioned between the tubular section of said container and said winding unit, a metal washer member interposed between said closure member and an opposite end of said winding unit having a portion thereof engaging said closure member and another portion thereof engaging said opposite end of said winding unit, and a lead wire passing through said closure member and connected with said washer member.

References Cited in the file of this patent

UNITED STATES PATENTS

| | | |
|---|---|---|
| 1,796,855 | Ahlers | Mar. 17, 1931 |
| 2,572,312 | Burge et al. | Oct. 23, 1951 |

FOREIGN PATENTS

| | | |
|---|---|---|
| 822,164 | France | Sept. 13, 1937 |
| 474,695 | Italy | Sept. 29, 1952 |